US008402143B2

(12) United States Patent
Ramaswamy et al.

(10) Patent No.: US 8,402,143 B2
(45) Date of Patent: Mar. 19, 2013

(54) SECURE PROXIES FOR FLAT NETWORKS

(75) Inventors: Suresh Ramaswamy, Chelmsford, MA (US); Woojune Kim, Arlington, MA (US); Prince Samar, Waltham, MA (US); Prasasth R. Palnati, Westford, MA (US); Shi Baw Ch'ng, North Billerica, MA (US); Arthur J. Barabell, Sudbury, MA (US)

(73) Assignee: Airvana LLC, Chelmsford, MA (US)

( * ) Notice: Subject to any disclaimer, the term of this patent is extended or adjusted under 35 U.S.C. 154(b) by 51 days.

(21) Appl. No.: 11/966,535

(22) Filed: Dec. 28, 2007

(65) Prior Publication Data

US 2009/0172169 A1    Jul. 2, 2009

(51) Int. Cl.
    *G06F 15/16* (2006.01)
(52) U.S. Cl. ...................................... 709/227
(58) Field of Classification Search ............. 709/228, 709/227; 370/328
    See application file for complete search history.

(56) References Cited

U.S. PATENT DOCUMENTS

| 5,983,281 | A * | 11/1999 | Ogle et al. ............. 709/249 |
| 6,711,144 | B1 | 3/2004 | Kim et al. |
| 6,731,618 | B1 | 5/2004 | Chung et al. |
| 6,741,862 | B2 | 5/2004 | Chung et al. |
| 6,781,999 | B2 | 8/2004 | Eyuboglu et al. |
| 7,170,871 | B2 | 1/2007 | Eyuboglu et al. |
| 7,200,391 | B2 | 4/2007 | Chung et al. |
| 7,242,958 | B2 | 7/2007 | Chung et al. |
| 7,277,446 | B1 | 10/2007 | Abi-Nassif et al. |
| 7,299,278 | B2 | 11/2007 | Ch'ng |
| 2002/0196749 | A1 | 12/2002 | Eyuboglu et al. |
| 2003/0100311 | A1 | 5/2003 | Chung et al. |
| 2003/0135626 | A1 * | 7/2003 | Ray et al. ................ 709/228 |
| 2004/0114553 | A1 * | 6/2004 | Jiang et al. ................ 370/328 |
| 2005/0213555 | A1 | 9/2005 | Eyuboglu et al. |
| 2005/0243749 | A1 | 11/2005 | Mehrabanzad et al. |

(Continued)

FOREIGN PATENT DOCUMENTS

| GB | 2452688 | 3/2009 |
| GB | 2468259 | 9/2010 |

(Continued)

OTHER PUBLICATIONS

3GPP2, 'Interoperability Specification for HRPD RAN Interfaces with Session Control in the PCF', Oct. 2006, 3GPP2 A.S0009-B v1.0, pp. 2-50-2-52, 5-132-5-136.*

(Continued)

*Primary Examiner* — Moustafa M Meky
*Assistant Examiner* — Hee Soo Kim
(74) *Attorney, Agent, or Firm* — Fish & Richardson P.C.

(57) ABSTRACT

A proxy is in communication with an internet protocol network and a mobile operator network. The proxy receives first communications from access points via the internet protocol network, transmits content from the first communications to the mobile operator network, receives second communications from the mobile operator network, and transmits content from the second communications to the access points via the internet protocol network. The proxy may perform operations based on the first and second communications received from either the access points, or from the mobile operator network. The operations performed by the proxy may include modifying the communications, saving certain information regarding the communications, performing authentication, encryption, or decryption of the communications, determining a destination for the communications, or sending the communications to a destination.

34 Claims, 7 Drawing Sheets

U.S. PATENT DOCUMENTS

| | | | |
|---|---|---|---|
| 2005/0245279 A1 | 11/2005 | Mehrabanzad et al. | |
| 2005/0254451 A1* | 11/2005 | Grosbach | 370/328 |
| 2006/0067422 A1 | 3/2006 | Chung | |
| 2006/0067451 A1 | 3/2006 | Pollman et al. | |
| 2006/0126509 A1 | 6/2006 | Abi-Nassif | |
| 2006/0159045 A1 | 7/2006 | Ananthaiyer et al. | |
| 2006/0240782 A1 | 10/2006 | Pollman et al. | |
| 2006/0274692 A1 | 12/2006 | Ryu | |
| 2006/0291420 A1 | 12/2006 | Ng | |
| 2006/0294241 A1 | 12/2006 | Cherian et al. | |
| 2007/0026884 A1 | 2/2007 | Rao | |
| 2007/0058628 A1 | 3/2007 | Rao et al. | |
| 2007/0077948 A1 | 4/2007 | Sharma et al. | |
| 2007/0097916 A1 | 5/2007 | Eyuboglu et al. | |
| 2007/0115896 A1 | 5/2007 | To et al. | |
| 2007/0140172 A1 | 6/2007 | Garg et al. | |
| 2007/0140184 A1 | 6/2007 | Garg et al. | |
| 2007/0140185 A1 | 6/2007 | Garg et al. | |
| 2007/0140218 A1 | 6/2007 | Nair et al. | |
| 2007/0155329 A1 | 7/2007 | Mehrabanzad et al. | |
| 2007/0220573 A1 | 9/2007 | Chiussi et al. | |
| 2007/0230419 A1 | 10/2007 | Raman et al. | |
| 2007/0238442 A1 | 10/2007 | Mate et al. | |
| 2007/0238476 A1 | 10/2007 | Sharma et al. | |
| 2007/0242648 A1 | 10/2007 | Garg et al. | |
| 2007/0248042 A1 | 10/2007 | Harikumar et al. | |
| 2008/0003988 A1 | 1/2008 | Richardson | |
| 2008/0013488 A1 | 1/2008 | Garg et al. | |
| 2008/0062925 A1 | 3/2008 | Mate et al. | |
| 2008/0065752 A1 | 3/2008 | Ch'ng et al. | |
| 2008/0069020 A1 | 3/2008 | Richardson | |
| 2008/0069028 A1 | 3/2008 | Richardson | |
| 2008/0069070 A1* | 3/2008 | Sayeedi et al. | 370/342 |
| 2008/0076398 A1 | 3/2008 | Mate et al. | |
| 2008/0117842 A1 | 5/2008 | Rao | |
| 2008/0119172 A1 | 5/2008 | Rao et al. | |
| 2008/0120417 A1 | 5/2008 | Harikumar et al. | |
| 2008/0139203 A1 | 6/2008 | Ng et al. | |
| 2008/0146232 A1 | 6/2008 | Knisely | |
| 2008/0151843 A1 | 6/2008 | Valmikam et al. | |
| 2008/0159236 A1 | 7/2008 | Ch'ng et al. | |
| 2008/0162924 A1 | 7/2008 | Chinitz et al. | |
| 2008/0162926 A1 | 7/2008 | Xiong et al. | |
| 2008/0253550 A1 | 10/2008 | Ch'ng et al. | |
| 2008/0254792 A1 | 10/2008 | Ch'ng | |
| 2009/0034440 A1 | 2/2009 | Samar et al. | |
| 2009/0082020 A1 | 3/2009 | Ch'ng et al. | |
| 2009/0088155 A1 | 4/2009 | Kim | |
| 2009/0172169 A1 | 7/2009 | Ch'Ng et al. | |

FOREIGN PATENT DOCUMENTS

| | | |
|---|---|---|
| WO | WO2009/085947 | 7/2009 |

OTHER PUBLICATIONS

International Search Report and Written Opinion from corresponding PCT application No. PCT/US2008/087416 mailed Mar. 26, 2009 (17 pages).

3rd Generation Partnership Project 2 "3GPP2", "cdma2000 High Rate Packet Data Interface Specification", C.S0024, version 2, Oct. 27, 2000 (441 pages).

3rd Generation Partnership Project 2 "3GPP2", "cdma2000 High Rate Packet Data Interface Specification", C.S0024-A, version 2, Jul. 2005 (1227 pages).

3rd Generation Partnership Project 2 "3GPP2", "cdma2000 High Rate Packet Data Interface Specification", C.S0024-B, version 1, Apr. 2006 (1623 pages).

3rd Generation Partnership Project 2 "3GPP2", "cdma2000 High Rate Packet Data Interface Specification"; C.S0024-B, version-2, Mar. 2007 (1627 pages).

3rd Generation Partnership Project 2 "3GPP2", "cdma2000 High Rate Packet Data Interface Specification", C.S0024, version 4, Oct. 25, 2002 (548 pages).

United Kingdom Examination Report from United Kingdom application No. GB1011041.9 issued Jan. 30, 2012 (2 pages).

Response to United Kingdom Examination Report from United Kingdom application No. GB1011041.9 issued Jan. 30, 2012, filed Apr. 3, 2012 (9 pages).

United Kingdom Examination Report from United Kingdom application No. GB1011041.9 issued May 9, 2012 (2 pages).

Response to United Kingdom Examination Report from United Kingdom application No. GB1011041.9 issued May 9, 212, filed Jun. 26, 2012 (4 pages).

International Preliminary Report on Patentability from corresponding PCT application No. PCT/US2008/087416 mailed Jun. 29, 2010 (16 pages).

* cited by examiner

SECURE PROXIES FOR FLAT NETWORKS

TECHNICAL FIELD

This description relates to proxies for flat networks.

BACKGROUND

High Data Rate (HDR) is an emerging mobile wireless access technology that enables access to personal broadband Internet services. HDR is an air interface designed for use with Internet Protocol (IP) packet data services, and can deliver a shared forward link transmission rate of up to 2.46 Mbit/s per sector using (1X) 1.25 MHz of spectrum. HDR networks are compatible with CDMA2000 radio access and wireless IP networks, and can be built on IP technologies, thereby taking advantage of the scalability, redundancy, and low-cost of IP networks.

An EVolution of the current 1xRTT standard for high-speed data-only (DO) services, also known as the 1xEV-DO protocol, has been standardized by the Telecommunication Industry Association (TIA) as TIA/EIA/IS-856, "CDMA2000 High Rate Packet Data Air Interface Specification", 3GPP2 C.S0024-0, Version 4.0, Oct. 25, 2002, which is incorporated herein by reference. Revision A to this specification has been published as TIA/EIA/IS-856, "CDMA2000 High Rate Packet Data Air Interface Specification", 3GPP2 C.S0024-A, Version 2.0, June 2005, and is also incorporated herein by reference.

The combination of personal base stations (sometimes referred to as "femto cells") and wired IP broadband has resulted in a new generation of wireless network—the flat network. The flat network may assume many forms. In one example, a flat network contains no routers; that is, the network is one large broadcast domain. Other examples of flat networks include Femto Cells and BSRs. Femto cells may use a residential IP broadband (e.g., Internet) connection to connect to a wireless operator's core network. For example, customers may connect femto cells to the Internet via cable and DSL (digital subscriber line) modems. BSR networks flatten a mobile network by integrating and collapsing radio access network elements, and may even integrate the base station and radio network controller (RNC) elements into a smaller single unit.

SUMMARY

In general, in one aspect, a proxy is in communication with an internet protocol network and a mobile operator network. The proxy receives first communications from access points via the internet protocol network, transmits content from the first communications to the mobile operator network, receives second communications from the mobile operator network, and transmits content from the second communications to the access points via the internet protocol network.

Implementations may include one or more of the following features. The proxy performs operations based on the first and second communications received from either the access points, or from the mobile operator network. The operations performed by the proxy may include one or more of modifying the communications, saving certain information regarding the communications, performing authentication, encryption, or decryption of the communications, determining a destination for the communications, or sending the communications to a destination. One or more of the access points may comprise the proxy. One or more elements within the second network may comprises the proxy. The proxy may facilitate the transfer of a dormant session for an access terminal from a first subnet to a second subnet. The first and second subnets may be located in the same network. The first and second subnets may be located in different networks. The proxy may facilitate the transfer of an active session for an access terminal from a first subnet to a second subnet. The first and second subnets may use different telecommunications protocols.

In general, in another aspect, access points exchange communications between cellular networks and an internet protocol network. A proxy receives first communications from the access points via the internet protocol network, transmits content from the first communications to a mobile operator network, receives second communications from the mobile operator network, and for transmits content from the second communications to the access points via the internet protocol network.

Implementations may include one or more of the following features. The proxy may perform operations based on communications received from either the access points, or from the mobile operator network. The operations may include one or more of modifying the communications, saving certain information regarding the communications, performing authentication, encryption, or decryption of the communications, determining a destination for the communications, or sending the communications to a destination. One or more of the access points may comprise the proxy. One or more elements within the network may comprise the proxy. The proxy may facilitate the transfer of a dormant session for an access terminal from a first subnet to a second subnet. The first and second subnets may be located in the same network. The first and second subnets may be located in different networks. The proxy may facilitate the transfer of an active session for an access terminal from a first subnet to a second subnet. The first and second subnets may use different telecommunications protocols.

In general, in another aspect, a first cellular network comprises at least one access point for communicating with an access terminal, a second cellular network comprised of at least one access point for communicating with an access terminal, and a proxy for facilitating communication between the first cellular network and the second cellular network. The first cellular network is connected to the proxy using internet protocol, and communications exchanged between the first cellular network and the second cellular network pass through the proxy.

In general, in another aspect, one or more machine-readable media comprises instructions that are executable by a processing device of a proxy to receive communications from access points via an internet protocol network, and transmit the communications to a mobile operator network. The communications are exchanged between a set of cellular networks and the internet protocol network via the access points in the set of cellular networks. Communications are received from the mobile operator network, and are transmitted to the access points via the internet protocol network.

In general, in another aspect, access points exchange communications between an access terminal and a set of cellular networks. A proxy receives communications from the access points via a dedicated circuit, and the proxy transmits the communications to a mobile operator network. The proxy also receives communications from the mobile operator network and transmits the communications to the access points via the dedicated circuit.

In general, in another aspect, a first set of access points exchanges communications between a set of cellular networks and an internet protocol network. A proxy receives first communications from the first set of access points via the internet protocol network, transmits content from the first communications to a second set of access points, receives second communications from the second set of access points, and transmits content from the second communications to the first set of access points via the internet protocol network.

DETAILED DESCRIPTION

The proxy represents a set of access points to a network that is separate from the set of access points (an "outside network"). The number of access points that a particular proxy may represent may range from just a handful to hundreds, thousands and even millions. Elements within the outside network only need to know and maintain information regarding the proxy, as opposed to each of the multitude of access points that it represents. Thus, the proxy function provides scalability as a set of access points can be abstracted by a single proxy for network protocol communication from outside networks.

The proxy may receive a message from an access point it represents, perform certain actions based on the message including authentication and/or decryption, possibly save certain information regarding the message for future use, make certain modifications to the message and send it to an outside network entity of interest. Similarly, the proxy may receive a message from an outside network entity, perform certain actions based on the message including authentication and/or decryption, possibly save certain information regarding the message for future use, make certain modifications to the message, determine the access point to which the message should be sent and send the message to that access point.

The proxy function may be resident on one of the access points that it represents. The proxy function could also be distributed across more than access points to provide load balancing and fault tolerance. Alternately, the proxy function may be resident on a highly secure, highly scalable machine that is physically separate from the set of access points it represents.

As noted above, there is no requirement that a proxy be physically distinct from a non-proxy. A suitable leader can be elected from among the nodes to play the proxy role; this leader will simultaneously be acting out both the non-proxy and proxy roles. That is, the proxy may itself be providing the services of a regular access point.

Whenever a user's service needs to be transferred from/to an access point represented by the proxy to/from an outside network entity, the outside network entity only needs to know about the existence of the proxy and communicate with it to perform the service transfer. The outside network entity does not need to know about the existence of any of the multitude of access points represented by the proxy. The proxy performs the function of receiving the message from either end and determining the appropriate destination for the message.

The proxy also provides secure communication for this service transfer of the user. Examples of service transfer include dormant session handoffs, active call and session handoffs and inter-technology handoffs.

We describe the concept by providing two detailed examples for two different implementations of the proxy functionality for flat 1xEV-DO networks: base station router (BSR) networks, and femto-cell networks.

Figure 1:
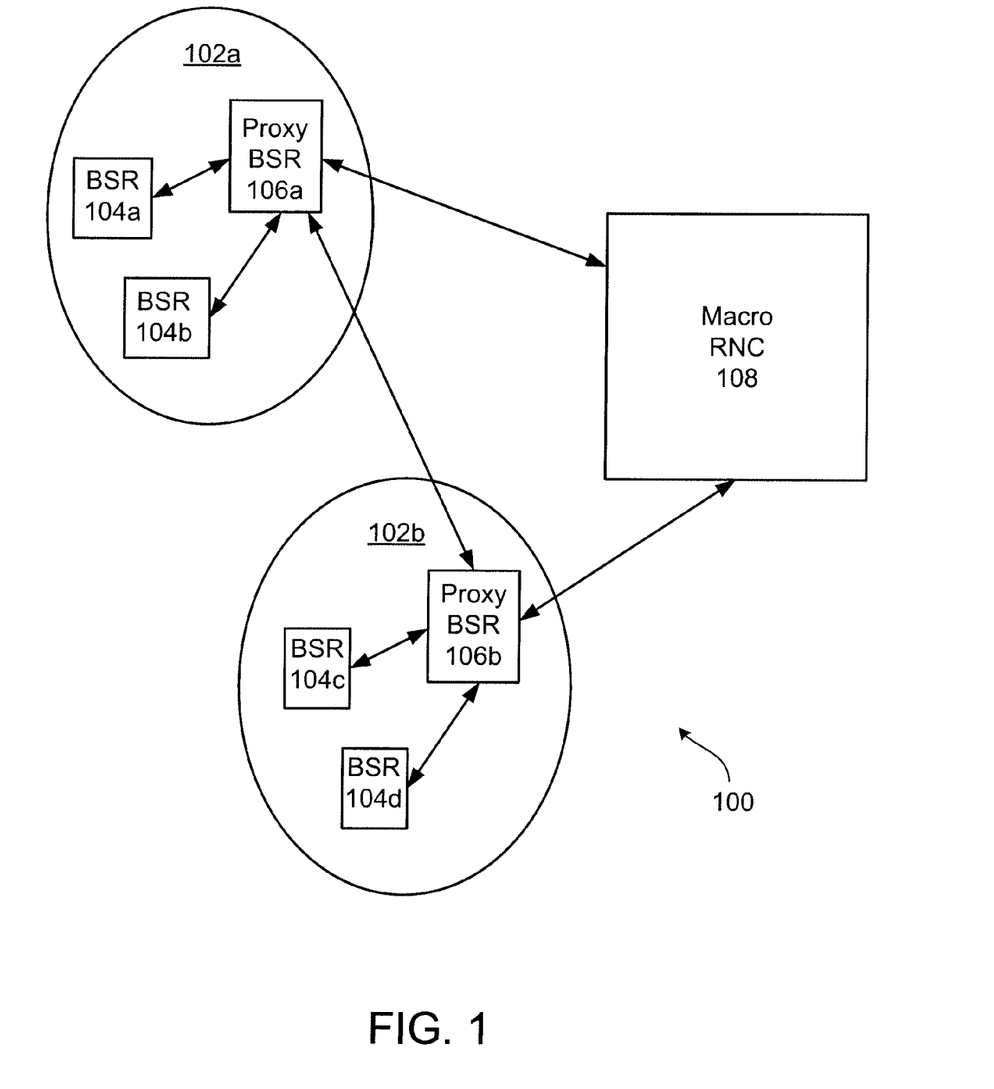
FIG. 1 shows a base station router (BSR) A13 proxy architecture.

FIG. 1 shows a BSR A13 network architecture 100. The architecture includes two BSR subnets 102a and 102b and a Macro-RNC 108. The BSR subnets may be, e.g., residential networks, and the Macro-RNC 108 may be a cellular network or a gateway thereto. For example, BSR 104a and BSR 104b may be personal base stations within a subscriber's residence. A personal base station may be programmable, and may include a processor for executing instructions to communicate with Macro-RNC 108 via Proxy BSR 106a. Communication may be in accordance with any protocols, including those mentioned herein. Proxy BSR 106a is likewise programmable, and may include a processor for executing instructions to route communications between Macro-RNC 108 and one of more of BSRs 104a, 104b. As described herein, Proxy BSR 106a may perform functions in addition to routing, such as load balancing. To enable these, and other functions, Proxy BSR 106a may also be configured (e.g., programmed) to communicate directly with other Proxy BSRs, such as Proxy BSR 106b (as shown in FIG. 1). This is described in more detail below. The Proxy BSRs and the BSRs are depicted as separate devices in FIG. 1. However, the functionality of both devices may be combined into a single device.

Although only two subnets 102a and 102b are shown in FIG. 1, the architecture could include any number of subnets, proxies, BSRs, Macro-RNCs, and other network components (not shown). BSRs 104a-d act as access points within BSR Subnet 102a and BSR Subnet 102b. In other words, the BSRs connect directly to a user's device, such as a cellular telephone, via the BSRs. Such connections are typically wireless; however, there may be wired components to the connections as well. The BSRs may use A13+ messaging to communicate with the BSR proxies 106a and 106b of their respective subnets. A13+ messages may carry non-proprietary information in addition to the A13 message itself. The Proxy BSRs 106a and 106b may communicate with the Macro-RNC and other Proxy BSRs (belonging to other subnets) using the standard A13+ protocol.

BSRs 104a-b within a BSR subnet 102a communicate with remote BSR proxies (e.g., Proxy BSR 106b) through Proxy BSR 106a using A13 messages. In this example, BSRs 104a and 104b do not communicate with Proxy BSR 106b, as it is located within subnet 102b. In operation, Proxy BSR 106a receives an A13+ message from a BSR 104a or 104b, and strips out proprietary information. The proprietary information in this case consists of the IP address and the UDP port of the remote peer that the BSR proxy 106a needs to forward the message to. It then forwards the A13 message to a remote A13 peer. In this context, a "remote A13 peer" may be either a BSR in a different subnet, a BSR of Macro-RNC 108, and/or some other device (not shown) on another subnet or Macro-RNC 108. Similarly, proxy 106a receives A13 messages from a remote A13 peer (Macro-RNC 108 in this example), and forwards the message to the appropriate BSR using A13+ messaging.

The Proxy BSRs 106a and 106b may perform security functions such as firewalling, packet filtering, and message validation to protect the remote Proxy BSRs from hacking attacks from un-trusted public internet. For example, because Proxy BSR 106a only needs to terminate and secure a connection from Proxy BSR 106b (as opposed to connections from hundreds or thousands of BSRs), securing the connection requires less resources.

BSR proxies may also perform service transfers for the access terminals (AT) that it is servicing. Some examples of service transfer include dormant session handoffs, active call and session handoffs, and inter-technology handoffs. These handoffs are described in detail below.

Figure 2:
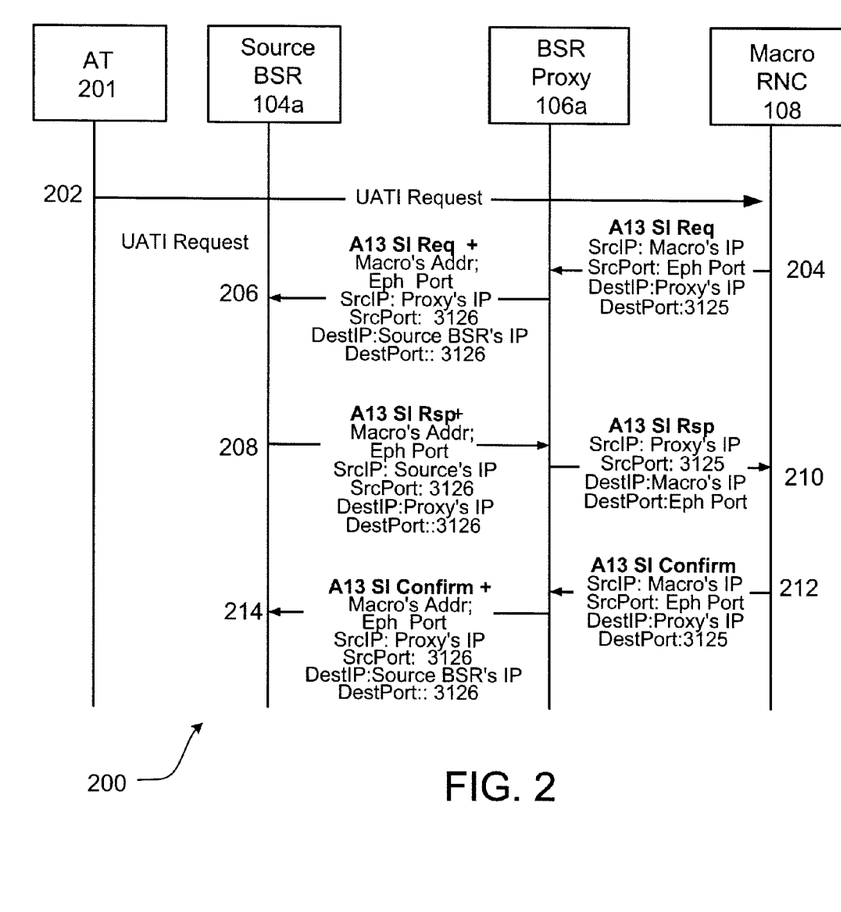
FIG. 2 is a timing diagram for an A13 dormant session transfer from a BSR subnet to a Macro-RNC.

FIG. 2 is a timing diagram that illustrates an A13 dormant session transfer from a BSR subnet to a Macro-RNC. In one example, a dormant session transfer refers to the transfer of service control for an AT from one network entity to another while that AT is not on an active call. However, call flows similar to those of FIG. 2 are also applicable for a dormant session transfer between a BSR subnet and another BSR subnet by substituting the Macro-RNC with the Proxy BSR of the other subnet. An A13 dormant session transfer from a BSR subnet to a Macro-RNC subnet may occur when an AT moves from the coverage area of a BSR 106a to the coverage area of a Macro-RNC 108. That is, each Proxy BSR may have a predefined geographical coverage area. For example, a Proxy BSR and the BSRs with which it directly communicates may have a coverage area such as subnet 102a. If an access terminal being served by Proxy BSR 106a moves outside of subnet 102a while it is not handling an active call, a dormant session transfer will occur. If the AT crosses the boundary of subnet 102a and moves into the coverage area of Macro-RNC 108, the dormant session transfer will result in the the AT being serviced by Macro-RNC 108. When a terminal device moves from the coverage area of a first Proxy BSR 106a to that of a second Proxy BSR 106b, a hand-off may occur, whereby the AT becomes a member of a subnet 102b associated with the second Proxy BSR 106b and relinquishes membership in the subnet 102a associated with the first Proxy BSR 106a. This is described below.

Referring to FIG. 2, in 202, AT 201 sends a Unicast Access Terminal Identifier (UATI) request to Macro-RNC 108. A UATI request is a request for a universally unique identifier, and the request is initiated when an AT crosses a subnet boundary. This identifier is used to address the AT when it is receiving messages from the BSR. In 204, Macro-RNC 108 sends an A13 session information (SI) request to Proxy BSR 106a, which passes the request along to the source BSR 104a in step 206 as an A13 SI request+ message. An A13 SI request is a message containing the source IP address (e.g., the IP address of either the Proxy BSR or the Macro-RNC), the source port (e.g., the port used by either the Macro-RNC or the Proxy BSR to send outgoing messages), the destination IP address (the IP address of either the proxy or the BSR), and the destination port (e.g., the port used by either the BSR or the Proxy BSR to receive incoming messages).

In 206, the A13 SI request+ message contains the original A13 SI request message, and in addition it includes the macro RNC's IP address and the Ephemeral source port of the macro RNC. The source and destination values are changed to correspond with the Proxy BSR 106a and source BSR 104a, respectively. This is done because in 204 and 206, the message originated at the Macro-RNC and reached the BSR; in 208 and 210, the SI response instead originates at the BSR and reaches the Macro-RNC. In 208, the source BSR 104a sends a A13 SI response+ message that includes the macro RNC's IP address and the ephemeral port that the macro RNC had sent in the A13 SI request message in addition to the standard A13 SI response message. The proxy BSR 106a relays the A13 SI response message to the macro-RNC as seen in Step 210. Actions 212 and 214 complete the dormant session transfer by relaying an A13 SI confirm message from macro-RNC 108 to source BSR 104a through Proxy BSR 106a.

If the UATI for the AT was assigned by the BSR subnet, the Proxy BSR will use the UATI-128 sent by the remote A13 peer (Macro-RNC 108 in this case) in the A13 message to route the A13 message to the appropriate BSR in the BSR network as A13+ message. This will be the case when the BSR subnet transfers the session to the Macro-RNC 108, such as the example shown in FIG. 2.

If the UATI is not assigned by the BSR subnet (e.g., when the session is transferred from a Macro-RNC to a BSR in a BSR subnet), the Proxy BSR may store the mapping between the UATI-128 and the anchor BSR when the Proxy BSR receives a A13+ session information request message from a target BSR to be sent to the remote A13 peer. This information will be used by the Proxy BSR to forward any A13 message from the Macro-RNC to the right BSR as an A13+ message.

Figure 3:
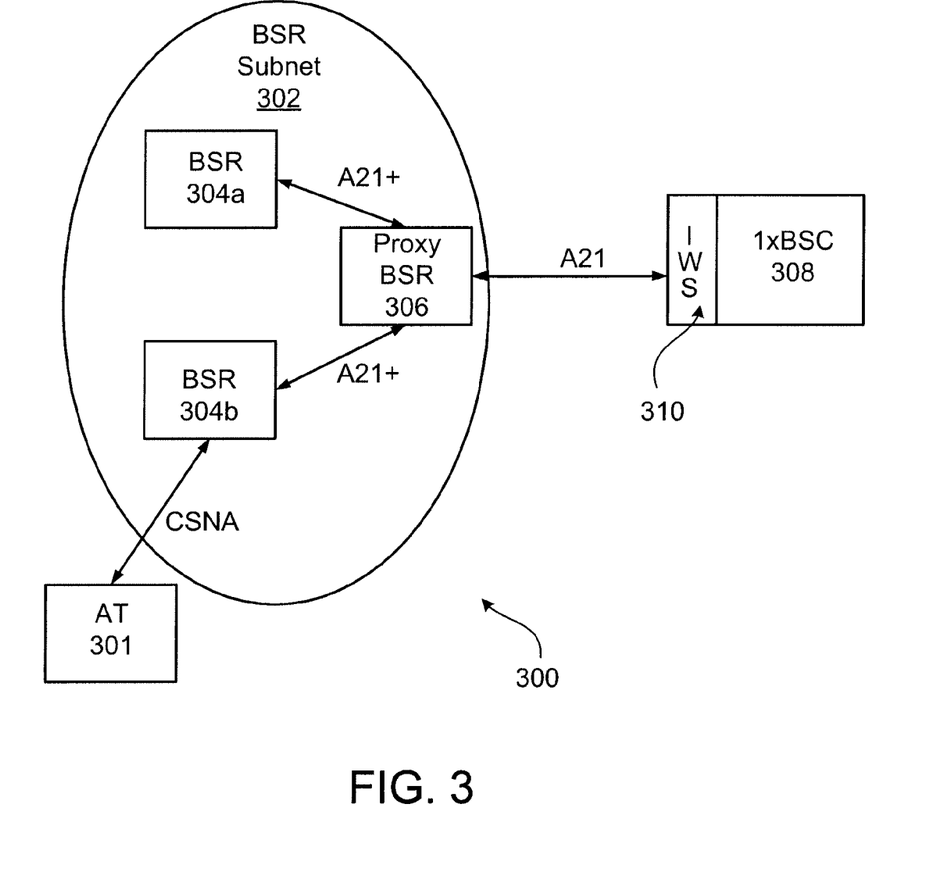
FIG. 3 shows a Proxy BSR network.

FIG. 3 is another example of a BSR network that makes use of proxies to exchange communications between BSRs and a larger communications network. The example network of FIG. 3 may be used to implement an A21 proxy architecture. BSR A21 proxy architecture 300 of FIG. 3 may be used to hand-down voice-over-internet protocol (VoIP) calls over a 1xEV-DO network to a CDMA2000 1x circuit switched network ("1x network") over an A21 interface. In other words, this architecture of FIG. 3 enables inter-technology handoffs. For example, when an AT 301 having an active VoIP call moves from a BSR subnet 302 toward a 1x network or a Macro EvDO network where there is no BSR coverage, the anchor BSR 304a attempts to keep the call active by handing it down to the 1x network into which the AT is entering. This hand-off is carried out in a coordinated way between the BSR 304a, the AT 301, and MSC 308.

The part of the MSC that handles the interface to the BSR network is called the inter-working solution (IWS) 310. The IWS 310 may be a standalone entity, or may be part of the base station controller (1xBSC) 308. The A21 IWS is used to pass 1x air interface signaling messages between the EvDO AN and the 1xBSC. Also, the A21 IWS may pass 1x information (1x overhead channel parameters) required to originate a 1x circuit voice call provided by the 1x BSC (via the EvDO AN, e.g., Proxy BSR 306, BSR 304a, or BSR 304b) to the AT 301.

The IWS is used between the BSR subnet 302 and the 1xBSC 308 to exchange signaling messages. The messaging between a BSR 304a and the A21 Proxy BSR 306 uses a proprietary interface called A21+. By forcing BSRs to communicate to the IWS 310 through a proxy 306, this makes it possible for the IWS to communicate with one element—Proxy BSR 306—instead of with numerous individual BSRs.

There are at least three scenarios for the VoIP hand down to 1x circuit voice. The first scenario involves a executing a hand down to maintain voice calls which begin on DO-BSR (as VoIP) but then move into a region without DO-BSR coverage. For example, if AT moves from the coverage area of BSR subnet 302 to an area outside its coverage (such as toward 1xBSC 308, a hand down to 1x circuit voice may occur to preserve the call. In another example, a hand down may occur to maintain a VoIP call, which began on a RevA EvDO_BSR, as the AT 301 moves into a Rev-0 BSR subnet, as the Rev-0 BSR subnet do NOT support VoIP calls. Applications such as VoIP that depend on the quality of service cannot be supported on 1xEVDO networks that use the Rev-0 of the standard due to the fact that there is no QoS support in the airlink. A third example is a hand down which occurs to maintain voice calls, which began on EvDO-BSR (as VoIP), when the network is about to close the speech reservation because the VoIP quality of service cannot be maintained. This hand down is executed when the quality of service for the AT falls below a certain threshold level. The hand down is then performed to bring the level of service up to a more desirable level.

Figure 4:
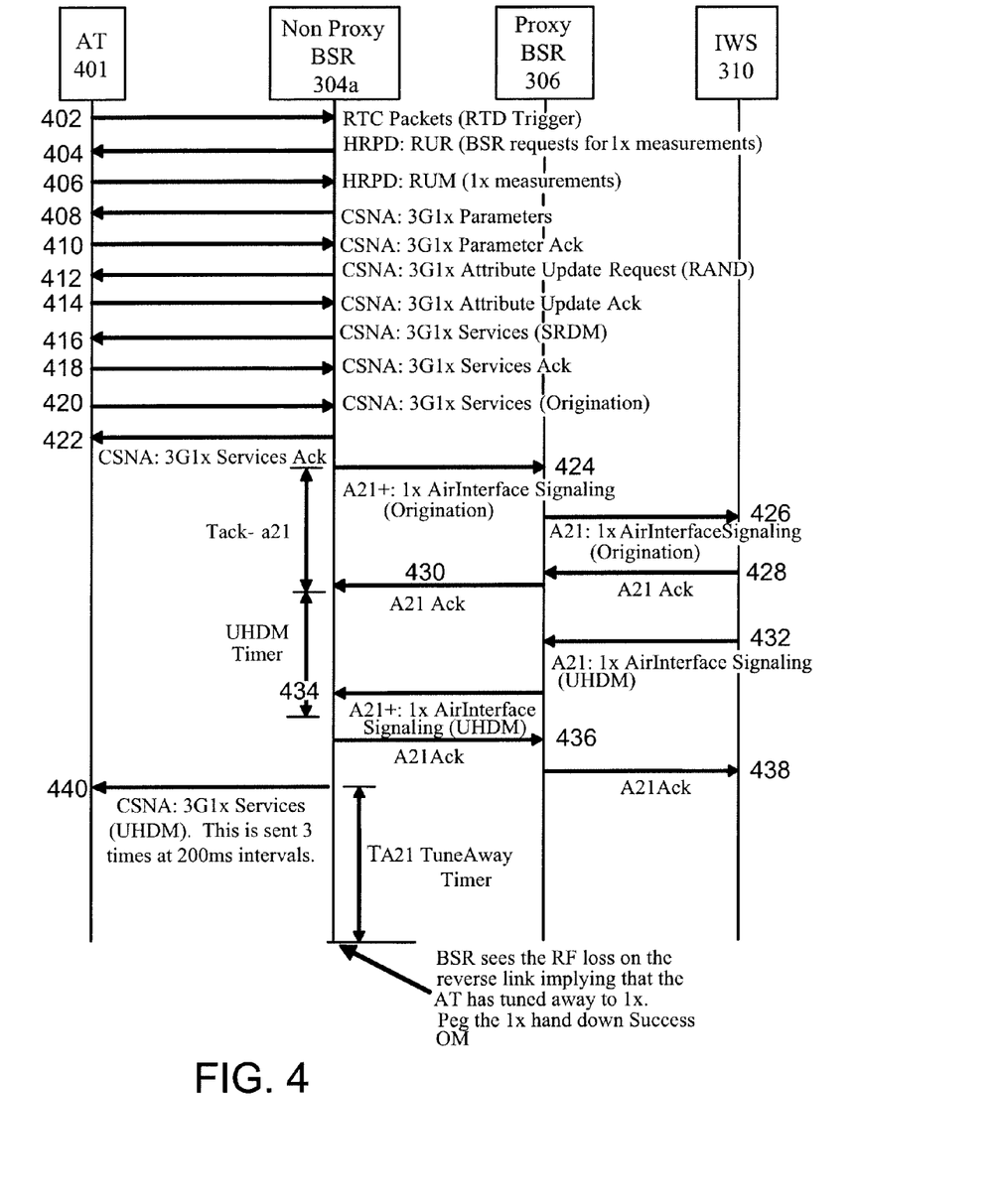
FIG. 4 shows the message flow of an EvDO VoIP to 1x circuit switch hand-down.

FIG. 4 shows the message flow of an EvDO VoIP to 1x circuit switch hand-down. The A21 VoIP hand down process is initiated in the anchor BSR that is hosting the EvDO session of the AT which has an ongoing VoIP call determines that the AT 401 is in a border area of the BSR-EvDO coverage, which may be a location substantially near the edge of the BSR subnet, usually where the BSR and 1x networks overlap. To preserve the call, the EvDO network hands the call to a 1x network. The message sequence in such a hand down procedure is as follows.

In 402 the BSR 304a generates a trigger to do VoIP hand down when the A21 trigger condition is met. An example of a trigger condition could be any one of the three examples described above, or could be another condition not described here. In 404, the BSR sends a Route Update Request message to the AT 401 to measure 1x pilot strengths. A pilot signal is a unique signal for each base station that is continuously transmitted within the entire area of coverage in order to identify the base station, and its strength is measured in decibels (dB). The BSR uses the 1x pilot set configured in its sector carrier database entry for the strongest pilot in the active set that originated the RTD based mobility trigger. The sector carrier database entry is a database maintained by the network that indicates the geographic positions covered by each sector. The position of an AT may then be monitored, and then the geographic sector database may be used as a basis to determine which sector or sectors the mobile station is physically positioned in. From this configured 1x pilot list for the particular sector carrier, the BSR first picks the first 1x pilot signal. From the remaining ones in the configured set, the BSR picks up only those pilots which have the same channel record as the first one picked up. The channel record may store limited information such as frequency values that mark channels in use, or may store detailed information describing every detected signal in every channel.

In 406, the AT sends back the Route Update Message with the 1x pilot measurements for the pilots belonging to the set present in the Route Update Record (RUR) that it received from the BSR. The RUR contains information relating to the quality of service routing within the network. It is possible that the AT may not report all the 1x pilots that were requested. Upon receiving this message, the BSR processes the 1x pilot information it received as described in section and keeps the resulting pilot information for future use during A21 origination message construction. In 408, the BSR sends the latest set of 3G 1x parameters to the AT through the CSNA: 3G 1x Parameters message. In 410, the AT sends an ack to the BSR after receiving the 3G 1x Parameters message. 412 shows the BSR sending the CSNA: AttributeUpdateRequest message with the RAND value. In 414, the AT sends an acknowledgement after receiving the RAND value, and then the BSR sends a CSNA: 3G 1x Services—Service Redirection Message (SRDM) to the AT in 416. In 418, the AT sends an ack to the BSR after receiving the SRDM message, and in 420, the AT then sends a CSNA: 1x Origination message to the BSR.

In 422, the BSR sends an acknowledgement to the AT after receiving the 1x origination message and then constructs an A21: Air Interface Signaling—Origination message. While constructing the 16 bit CorrelationId field, the BSR fills the first 9 bits with the BSR Id, leaves the next two bits (reserved for future use) and fills the last five bits with a 5 bit SessionId. This creates a temporary map between this SessionId and the UATI32 of the AT. This mapping is referenced when the UHDM is received from the IWS, to determine which AT the UHDM message should be sent to. Then the BSR encapsulates this message in an A21+ message with the A21+ header containing the IWS IP address and the port number of the A21 application in the IWS 310. After the BSR sends this message to the A21 Proxy BSR 306 of the subnet, the BSR starts a timer $T_{a21ack}$ in 424.

In 426, the Proxy BSR extracts the A21 message from the A21+ message and sends it to the IWS using the destination IP address and the port number from the A21+ header. Then, in 428, IWS then sends an A21 ack for the message, echoing back the upper 16 bits of the CorrelationId that it received in the A21 Origination message. In 430, the Proxy BSR uses the first 9 bits of the CorrelationId in the received A21 message to determine which BSR the message should be sent to. Then, the Proxy BSR encapsulates this A21 message in an A21+ message by putting the IP address and the port number of the IWS 310 from where this A21 message was received in the A21+ header. The Proxy BSR sends this A21+ message to the concerned BSR. The BSR cancels the $T_{a21ack}$ timer it was running and starts a new timer called $T_{uhdm}$.

In 432, the IWS performs the necessary interactions with the 1x BTS, base station, and other 1x network elements as needed and sends an A21 1x Air Interface Signaling (UHDM) message to the proxy. Then, in 434, the Proxy BSR relays this UHDM message to the appropriate BSR, as shown in 430. The BSR then cancels the UHDM timer and sends an A21 Ack to the Proxy BSR in the A21+ format in 436. In 438, the Proxy BSR extracts the A21 ack from the A21+ message and sends it to the IWS.

In 440, the BSR uses the 5 bit SessionId in the CorrelationId in the received A21 UHDM message and uses the mapping it had created earlier to determine which AT should receive the UHDM message. The proxy then sends this UHDM message to the AT using the CSNA: 3G1xServices message, and the BSR then starts timer, $T_{a21tuneaway}$.

Figure 5:
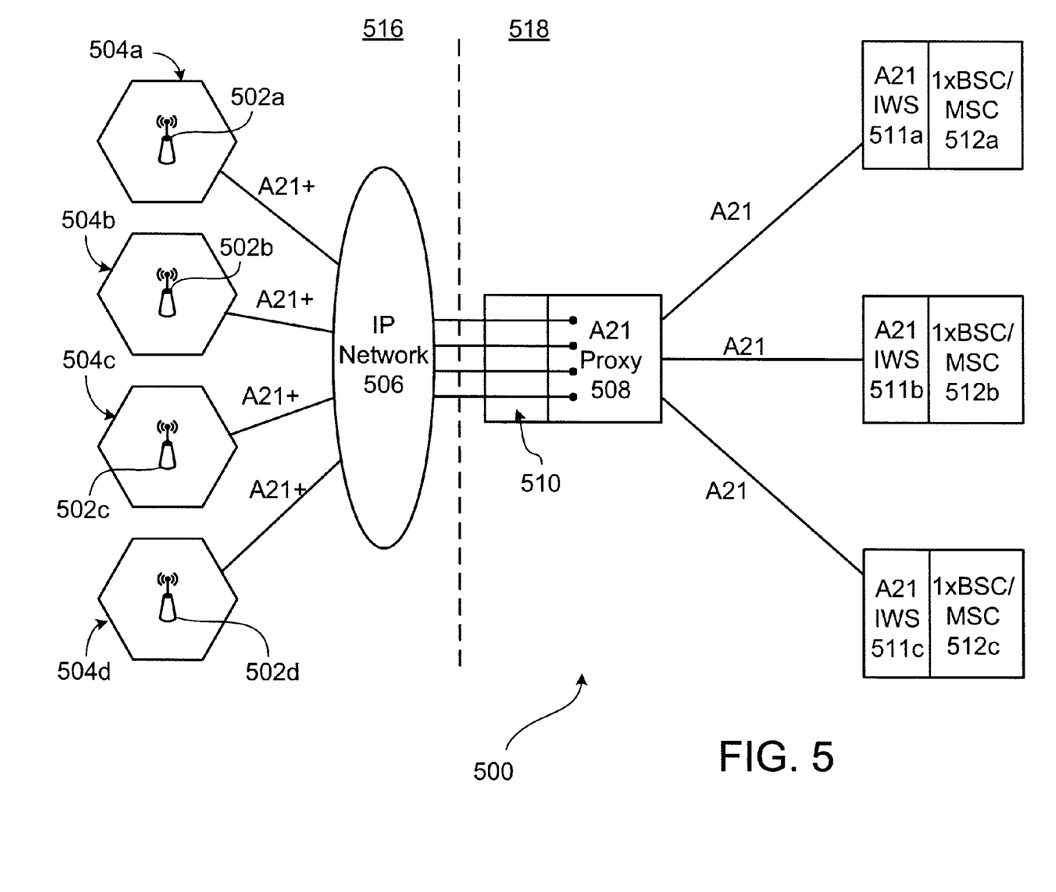
FIG. 5 shows a network environment.

FIG. 5 is an example of a network environment 500 that includes a public network 516 and a private mobile operator network 518. A set of cellular networks 504a-d have corresponding access points 502a-d. The access points communicate over an Internet Protocol (IP) network 506 to a proxy 508, and pass through a security gateway 510. The proxy 508 communicates with a number of 1xBSC or 1xMSC elements 512a-c, whose A21 termination points are termed A21 IWS 511a-c, using standard A21 protocol. Because an A21 termination point may be implemented at either the 1xBSC or the 1xMSc, the common term "A21 IWS" will be used hereinafter to refer to an A21 termination point in the 1xRTT networks. It should be noted that the A21 proxy does not need to be a separate device, as proxy functionality may reside in one of the access points that it represents.

In this example, the access points 502a-d may be personal base stations (PBS, sometimes referred to as "femto cell access points") which communicate with the proxy 508 over an IP network 506. By providing cellular bandwidth, each access point forms a small scale cellular network (e.g., 504a) that may exchange communications with an AT, similar to the previous BSR network examples.

The proxy 508 helps to improve the scalability of private networks by reducing the number of elements that a mobile operator network must interact with. For instance, from the perspective of an outside network 518 (such as a mobile operator network), the proxy represents a set of access points. Although only four access points are shown in FIG. 5, the number of access points that a particular proxy may represent may range from just a handful to hundreds, thousands, and even millions. Rather than maintaining information related to each of the multitude of access points that it represents, elements within the outside network only need to know and maintain information regarding the proxy 508. Thus, the proxy enhances the scalability of such networks, as a set of access points can be represented by a single proxy for exchanging messages with outside networks.

The proxy may receive a message from an access point and perform certain operations based on the message. The operations that a proxy performs may include authentication, encryption, or decryption of the message. The proxy may also save certain information regarding the message for future use, make certain modifications to the message, and send the message to an outside network entity such as A21 IWS 511*a*. Similarly, the proxy may receive a message from an outside network entity and perform certain operations based on the message. In addition to the operations mentioned previously, the proxy may also determine the access point to which the message should be sent, and send the message to that access point.

Figure 6:
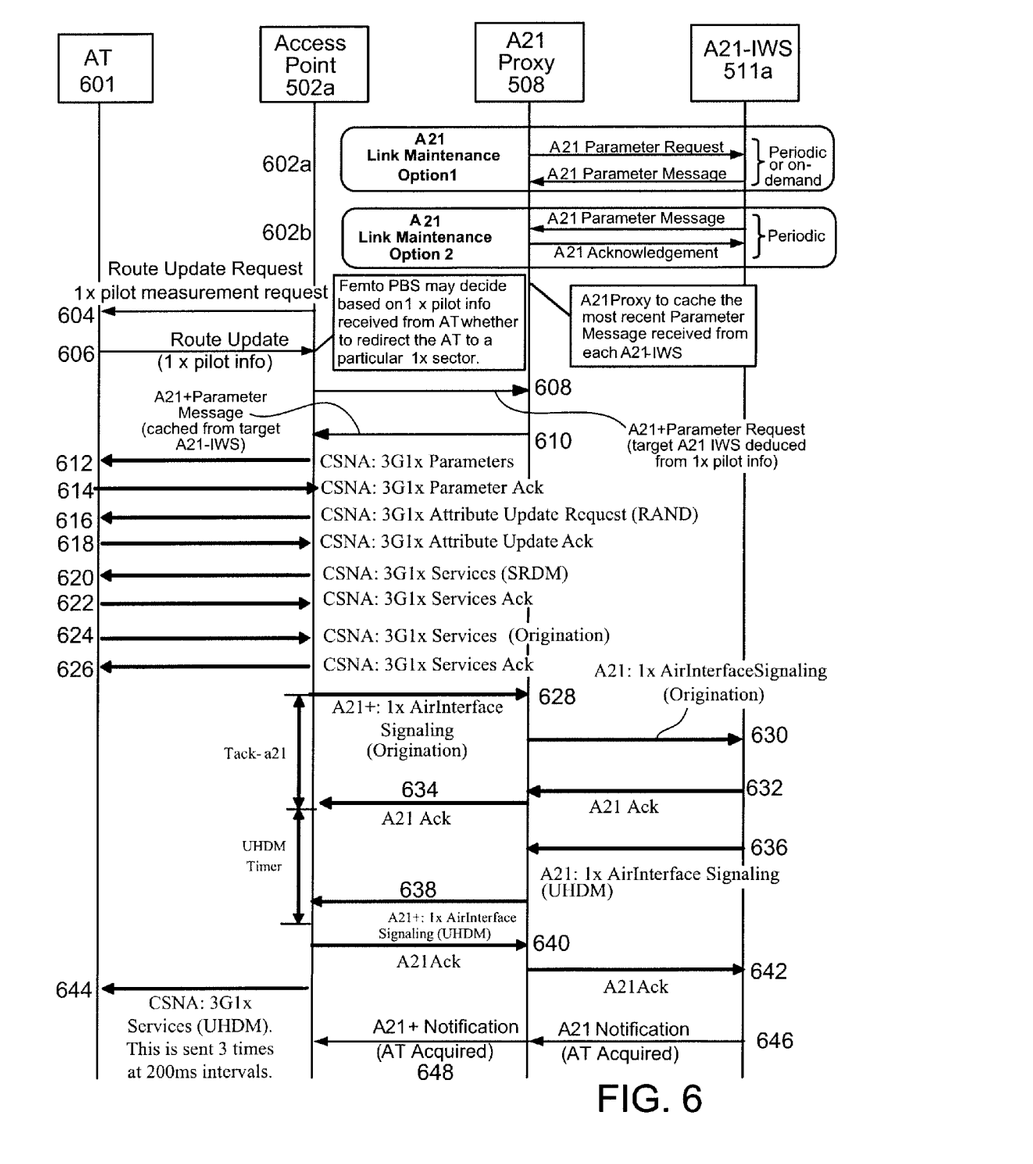
FIG. 6 shows femto-cell A21 proxy call flow.

FIG. 6 shows an example of a femto-cell A21 proxy call flow. To monitor the A21 communication link between the A21 Proxy and the A21-IWS, and to obtain up-to-date parameters, A21 Parameter Request and A21 Parameter messages are periodically and frequently exchanged (Option 1 ( 602*a*) in FIG. 6), or A21 Parameter and A21 Acknowledgement messages are periodically and frequently exchanged (Option 2 ( 602*b*) in FIG. 6). The message exchange frequency may be as high as once every few seconds.

The A21 proxy terminates such frequent exchanges as (1) it is not practical to make "millions" of femto-cells frequently exchange such messages with 1xRTT system at such a high frequency, (2) security considerations would preclude allowing femto-cells to connect to the 1xRTT systems to begin with, and (3) femto-cells need only support "pedestrian speed" mobility where handoff need not be completed overly quickly. Further, the A21 proxy obtains the latest A21 parameter information it received from each of its A21 interfaces. Femto-cells request its A21 Proxy for 1xRTT system parameters only when needed (e.g., when it wants to hand an AT off to a 1xRTT system).

In another implementation, each femto-cell may include applicable mapping information that maps pilots to A21-IWS end-points, and that when requesting for 1xRTT parameters (608 and 610 in call flow), that the femto-cell also indicates to the A21 proxy which A21 -IWS' parameters the femto-cell is asking for. This reduces the amount of computation the A21 proxy needs to perform to match pilot information to A21-IWS end-point, which can be substantial because an A21 proxy is expected to serve a very large number of femto-cells (in the order of "hundreds of thousands" or "millions").

In 612, the access point sends the latest set of 3G 1x parameters to the AT through the CSNA: 3G 1x Parameters message. In 614, the AT sends an acknowledgement to the access point after receiving the 3G 1x Parameters message. 616 shows the access point sending the CSNA: AttributeUpdateRequest message with the RAND value. In 618, the AT sends an acknowledgement after receiving the RAND value, and then the access point sends a CSNA: 3G 1x Services— Service Redirection Message (SRDM) to the AT in 620. In 622, the AT sends an ack to the access point after receiving the SRDM message, and in 624, the AT then sends a CSNA: 1x Origination message to the access point.

In 626, the access point sends an acknowledgement to the AT after receiving the 1x origination message and then constructs an A21: Air Interface Signaling—Origination message. While constructing the 16 bit CorrelationId field, the access point fills the first 9 bits with the BSR Id, leaves the next two bits (reserved for future use) and fills the last five bits with a 5 bit SessionId. This creates a temporary map between this SessionId and the UATI32 of the AT. This mapping is referenced when the UHDM is received from the IWS, to determine which AT the UHDM message should be sent to. Then the access point encapsulates this message in an A21+ message with the A21+ header containing the IWS IP address and the port number of the A21 application in the IWS 310. After the access point sends this message to the A21 Proxy 506 of the subnet, the access point starts a timer Ta21ack in 628.

In 630, the A21 Proxy extracts the A21 message from the A21+ message and sends it to the IWS using the destination IP address and the port number from the A21+ header. In 632, IWS then sends an A21 ack for the message, echoing back the upper 16 bits of the CorrelationId that it received in the A21 Origination message. In 634, the A21 Proxy uses the first 9 bits of the CorrelationId in the received A21 message to determine which access point the message should be sent to. Then, the A21 Proxy encapsulates this A21 message in an A21+ message by putting the IP address and the port number of the IWS 310 from where this A21 message was received in the A21+ header. The A21 Proxy sends this A21+ message to the concerned access point. The access point cancels the Ta21ack timer it was running and starts a new timer called Tuhdm.

In 636, the IWS performs the necessary interactions with the 1x BTS, base station, and other 1x network elements as needed and sends an A21 1x Air Interface Signaling (UHDM) message to the proxy. Then, in 638, the A21 Proxy relays this UHDM message to the appropriate access point. The access point then cancels the UHDM timer and sends an A21 Ack to the A21 Proxy in the A21+ format in 640. In 642, the A21 Proxy extracts the A21 ack from the A21+ message and sends it to the IWS.

In 644, the access point uses the 5 bit SessionId in the CorrelationId in the received A21 UHDM message and uses the mapping it had created earlier to determine which AT should receive the UHDM message. The A21 Proxy then sends this UHDM message to the AT using the CSNA: 3G1xServices message, and the access point then starts timer, Ta21tuneaway. In 646 and 648, an A21 notification is sent to the A21 Proxy, and A21+ notification is sent to the access point, respectively.

Figure 7:
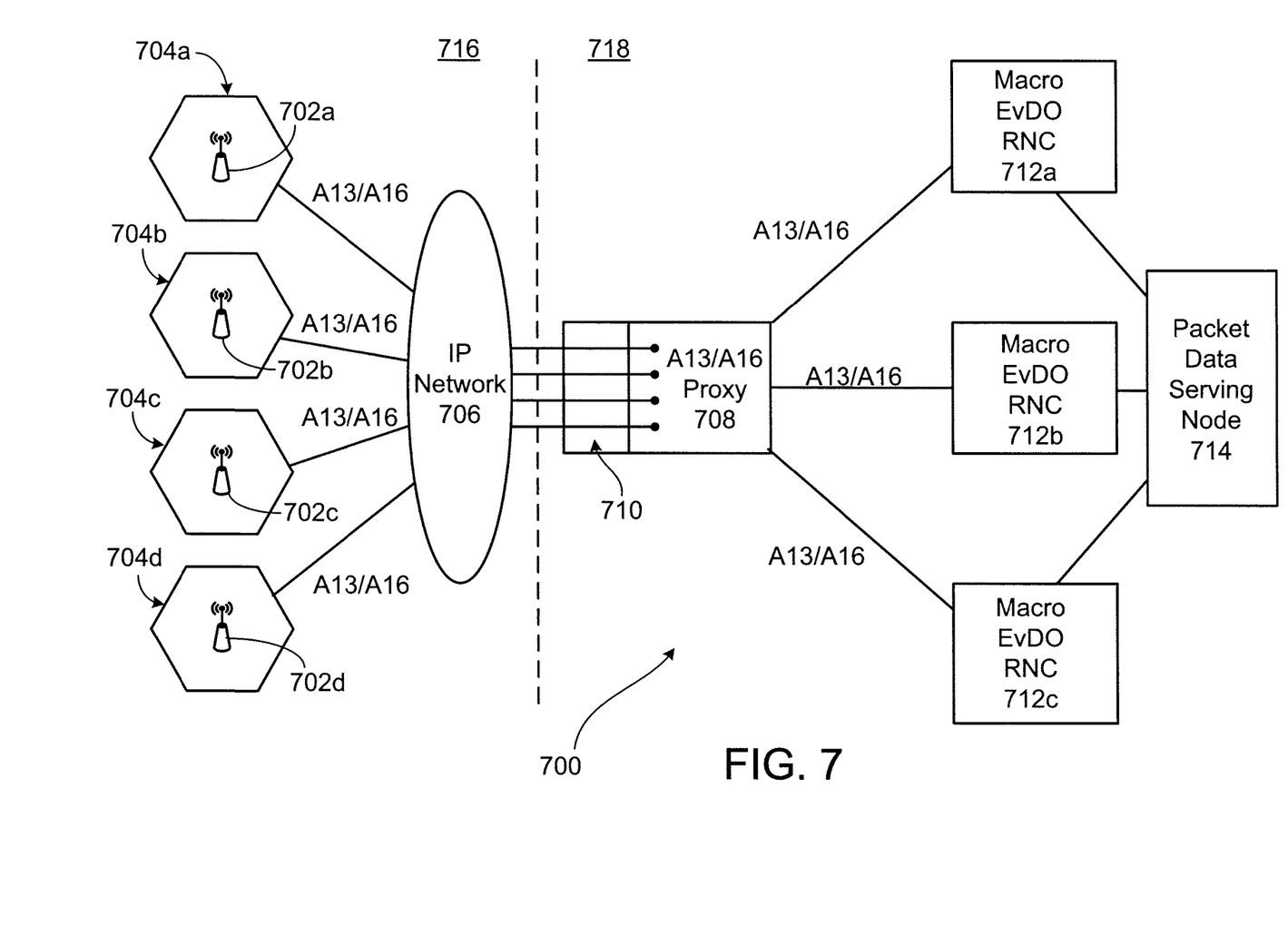
FIG. 7 shows a secure A13/A16 proxy architecture.

FIG. 7 is another example of a network environment 700 that includes a public network 716 and a private mobile operator network 718. A set of cellular networks 704*a-d* have corresponding access points 702*a-d*. The access points communicate over an IP network 706 to a proxy 708, and pass through a security gateway 710. The proxy 708 communicates with a number of macro EvDo RNC elements 712*a-c*. The macro EvDO elements 712*a-c* are each connected to the PDSN 714.

In this example, the different network elements communicate to each other using A13 signaling. The communication paths are labeled as "A13/A16" because the two protocols are very similar, and all concepts relating to A13 proxy architectures can be directly applied to A16 proxy architectures. A13 and A16 protocols allow 1xEV-RAN networks to transfer session contexts from one RNC to another for dormant and active calls, respectively. The functions performed by the proxy in this network example are similar to those described in previous examples, but in this case, the proxy uses A13/A16 signaling protocol to communicate with the various network elements.

All or part of the techniques described herein can be implemented in digital electronic circuitry, or in computer hardware, firmware, software, or in combinations of them. The techniques can be implemented as a computer program product, i.e., a computer program tangibly embodied in an information carrier, e.g., in a machine-readable storage device, for execution by, or to control the operation of, data processing apparatus, e.g., a programmable processor, a computer, or multiple computers. A computer program can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps of the techniques described herein can be performed by one or more programmable processors executing a computer program to perform functions of the invention by operating on input data and generating output. Method steps can also be performed by, and apparatus of the invention can be implemented as, special purpose logic circuitry, e.g., an FPGA (field programmable gate array) or an ASIC (application-specific integrated circuit). Modules can refer to portions of the computer program and/or the processor/special circuitry that implements that functionality.

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in special purpose logic circuitry.

All or part of the techniques described herein can be implemented in a distributed computing system that includes a back-end component, e.g., as a data server, and/or a middleware component, e.g., an application server, and/or a front-end component, e.g., a client computer having a graphical user interface and/or a Web browser through which a user can interact with an implementation of the invention, or any combination of such back-end, middleware, or front-end components. The components of the system can be interconnected by any form or medium of digital data communication, e.g., a communication network. Examples of communication networks include a local area network ("LAN") and a wide area network ("WAN"), e.g., the Internet, and include both wired and wireless networks.

Other embodiments are within the scope of the following claims. The following are examples for illustration only and not to limit the alternatives in any way. The techniques described herein can be performed in a different order and still achieve desirable results.

What is claimed is:

1. A method performed by a proxy that is in communication with a private network comprising a plurality of personal access points, the proxy acting as a single access point to the plurality of personal access points for a mobile operator network, the plurality of personal access points being configured to communicate with one or more access terminals, the method comprising:

receiving a first A21 communication from a source personal access point associated with the plurality of personal access points, the first communication being associated with a handoff of an active session established between one of the one or more access terminals and the source personal access point;

extracting, from the first A21 communication, an address that identifies an entity within the mobile operator network;

transmitting content from the first A21 communication to the entity within the mobile operator network identified by the address;

receiving a second communication from the mobile operator network;

extracting, from the second communication, a correlation identifier;

extracting a personal access point identifier of the source personal access point from the correlation identifier;

identifying the source personal access point based on the personal access point identifier;

transmitting content from the second communication to the source personal access point identified based on the personal access point identifier; and transferring, based at least in part on the first A21 communication, the second communication, and an A21 protocol, the active session from the source personal access point to the mobile operator network.

2. The method of claim 1, wherein the proxy performs operations based on the first communication and the second communication.

3. The method of claim 2, wherein the operations performed by the proxy comprise one or more of modifying the first communication or the second communication, saving information associated with the first communication or the second communication, performing authentication, encryption, or decryption of the first communication or the second communication, determining a destination for the first communication or the second communication, or sending the first communication or the second communication to a destination.

4. The method of claim 1, wherein one or more of the plurality of personal access points comprises the proxy.

5. The method of claim 1, wherein one or more elements within the mobile operator network comprises the proxy.

6. The method of claim 1, wherein the first communication comprises an A21 AirInterface Signaling message.

7. The method of claim 1, wherein the second communication comprises an A21 acknowledgement message.

8. The method of claim 1, wherein the active session comprises a voice-over-internet protocol (VoIP) session.

9. The method of claim 8, wherein transferring the active session comprises transferring the active session from a 1xEV-DO network associated with the source personal access point to a CDMA2000 1x circuit switched network associated with the mobile operator network.

10. The method of claim 9, wherein the 1xEV-DO network is associated with a first revision of a telecommunications standard and the CDMA2000 1x circuit switched network is associated with a second, different version of the telecommunications standard.

11. The method of claim 1, wherein one or more of the plurality of personal access points are portable.

12. An apparatus in a system comprising a mobile operator network and a private network comprising a plurality of personal access points, the plurality of personal access points being configured to communicate with one or more access terminals, the apparatus comprising:
a proxy configured to act as a single access point to the plurality of personal access points for the mobile operator network, the proxy being further configured to:
receive a first A21 communication from a source personal access point associated with the plurality of personal access points, the first communication being associated with a handoff of an active session established between one of the one or more access terminals and the source personal access point;
extract, from the first A21 communication, an address that identifies an entity within the mobile operator network;
transmit content from the first A21 communication to the entity within the mobile operator network identified by the address;
receive a second communication from the mobile operator network;
extract, from the second communication, a correlation identifier;
extract a personal access point identifier of the source personal access point from the correlation identifier;
identify the source personal access point based on the personal access point identifier;
transmit content from the second communication to the source personal access point; and
transfer, based at least in part on the first A21 communication, the second communication, and an A21 protocol, the active session from the source personal access point to the mobile operator network.

13. The apparatus of claim 12, wherein the proxy is configured to perform operations based on the first communication and the second communication.

14. The apparatus of claim 13, wherein the operations configured to be performed by the proxy comprises one or more of modifying the first or second communication, saving information associated with the first or second communication, performing authentication, encryption, or decryption of the first or second communication, determining a destination for the first or second communication, or sending the first or second communication to a destination.

15. The apparatus of claim 12, wherein the plurality of personal access points comprises the proxy.

16. The apparatus of claim 12, wherein one or more elements within the mobile operator network comprises the proxy.

17. The apparatus of claim 12, wherein the first communication comprises an A21 AirInterface Signaling message.

18. The apparatus of claim 12, wherein the second communication comprises an A21 acknowledgement message.

19. The apparatus of claim 12, wherein the active session comprises a voice-over-internet protocol (VoIP) session.

20. The apparatus of claim 19, wherein transferring the active session comprises transferring the active session from a 1xEV-DO network associated with the source personal access point to a CDMA2000 1x circuit switched network associated with the mobile operator network.

21. The apparatus of claim 20, wherein 1xEV-DO network is associated with a first revision of a telecommunications standard and the CDMA2000 1x circuit switched network is associated with a second, different version of the telecommunications standard.

22. The apparatus of claim 12, wherein one or more of the plurality of personal access points are portable.

23. One or more machine-readable storage devices comprising instructions that are executable by one or more processing devices of a proxy, the proxy being in communication with a private network comprising a plurality of personal access points, the proxy acting as a single access point to the plurality of personal access points for a mobile operator network, the plurality of personal access points being configured to communicate with one or more access terminals, the instructions for causing the proxy to perform operations comprising:
receiving a first A21 communication from a source personal access point associated with the plurality of personal access points, the first communication being associated with a handoff of an active session established between one of the one or more access terminals and the source personal access point;
extracting, from the first A21 communication, an address that identifies an entity within the mobile operator network;
transmitting content from the first A21 communication to the entity within the mobile operator network identified by the address;
receiving a second communication from the mobile operator network;
extracting, from the second communication, a correlation identifier;
extracting a personal access point identifier of the source personal access point from the correlation identifier;
identifying the source personal access point based on the personal access point identifier;
transmitting content from the second communication to the source personal access point identified based on the personal access point identifier; and
transferring, based at least in part on the first A21 communication, the second communication, and an A21 protocol, the active session from the source personal access point to the mobile operator network.

24. The one or more machine-readable storage devices method of claim 23, wherein the proxy performs operations based on the first communication and the second communication.

25. The one or more machine-readable storage devices of claim 24, wherein the operations performed by the proxy comprise one or more of modifying the first communication or the second communication, saving information associated with the first communication or the second communication, performing authentication, encryption, or decryption of the first communication or the second communication, determining a destination for the first communication or the second communication, or sending the first communication or the second communication to a destination.

26. The one or more machine-readable storage devices of claim 23, wherein one or more of the plurality of personal access points comprises the proxy.

27. The one or more machine-readable storage devices of claim 23, wherein one or more elements within the mobile operator network comprises the proxy.

28. The one or more machine-readable storage devices of claim 23, wherein the first communication is associated with the A21 protocol.

29. The one or more machine-readable storage devices of claim 28, wherein the first communication comprises an A21 AirInterface Signaling message.

30. The one or more machine-readable storage devices of claim 28, wherein the second communication comprises an A21 acknowledgement message.

31. The one or more machine-readable storage device of claim 23, wherein the active session comprises a voice-over-internet protocol (VoIP) session.

32. The one or more machine-readable storage devices of claim 31, wherein transferring the active session comprises transferring the active session from a 1xEV-DO network associated with the source personal access point to a CDMA2000 1x circuit switched network associated with the mobile operator network.

33. The one or more machine-readable storage devices of claim 32, wherein the 1xEV-DO network is associated with a first revision of a telecommunications standard and the CDMA2000 1x circuit switched network is associated with a second, different version of the telecommunications standard.

34. The one or more machine-readable storage devices of claim 23, wherein one or more of the plurality of personal access points are portable.

* * * * *

UNITED STATES PATENT AND TRADEMARK OFFICE
CERTIFICATE OF CORRECTION

| | |
|---|---|
| PATENT NO. | : 8,402,143 B2 |
| APPLICATION NO. | : 11/966535 |
| DATED | : March 19, 2013 |
| INVENTOR(S) | : Suresh Ramaswamy |

It is certified that error appears in the above-identified patent and that said Letters Patent is hereby corrected as shown below:

In the Claims:

In Column 14, Line 46, In Claim 24, before "of" delete "method".

In Column 15, Line 8, In Claim 31, delete "device" and insert --devices--, therefor.

Signed and Sealed this
Twenty-fifth Day of June, 2013

Teresa Stanek Rea
*Acting Director of the United States Patent and Trademark Office*